US010972528B2

(12) United States Patent
Cheng et al.

(10) Patent No.: US 10,972,528 B2
(45) Date of Patent: Apr. 6, 2021

(54) METHODS AND SYSTEMS FOR ACCESSING THIRD-PARTY SERVICES WITHIN APPLICATIONS

(71) Applicant: FACEBOOK, INC., Menlo Park, CA (US)

(72) Inventors: Derek Chirk Yin Cheng, Issaquah, WA (US); Karandeep Anand, Redwood City, CA (US); Edward Kenneth O'Neil, Seattle, WA (US); Christopher Chun-Ning Pan, Seattle, WA (US); Ming Fei Li, Seattle, WA (US); Sean Wiese, Seattle, CA (US); Prakash Ahuja, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 1006 days.

(21) Appl. No.: 15/236,342

(22) Filed: Aug. 12, 2016

(65) Prior Publication Data

US 2018/0048696 A1 Feb. 15, 2018

(51) Int. Cl.
*H04L 29/08* (2006.01)
*G06F 16/248* (2019.01)
(Continued)

(52) U.S. Cl.
CPC .......... *H04L 67/02* (2013.01); *G06F 3/04842* (2013.01); *G06F 16/248* (2019.01);
(Continued)

(58) Field of Classification Search
None
See application file for complete search history.

(56) References Cited

U.S. PATENT DOCUMENTS 9,094,464 B1 * 7/2015 Scharber .............. H04L 45/026
2007/0192206 A1 * 8/2007 Manesh ................. G06Q 30/02
705/26.35
(Continued)

FOREIGN PATENT DOCUMENTS

WO WO2015/103890 A1 7/2015
WO WO2015/180496 A1 12/2015

OTHER PUBLICATIONS

Jon Russell, "Didi Kuaidi, The Company Beating Uber In China, Opens Its API To Third Party Apps", Techcruch, pp. 1-2 (Year: 2016).*
(Continued)

*Primary Examiner* — Clayton R Williams
(74) *Attorney, Agent, or Firm* — Morgan, Lewis & Bockius LLP

(57) ABSTRACT

A client device provides to a user, in an application associated with a social-networking service provided by a server system, a link to a page associated with a third-party service provider. The third-party service provider is distinct from the social-networking service. In response to user selection of the link, the page is loaded within the application. The page includes script for calling one or more application programming interfaces (APIs) of the server system. The client device calls the one or more APIs to obtain information associated with the user from the server system. The client device displays the page within the application, and uses the information associated with the user to conduct a transaction with the third-party service provider through the page.

20 Claims, 9 Drawing Sheets

(51) Int. Cl.

| | | |
|---|---|---|
| *G06F 16/9535* | (2019.01) | |
| *G06F 16/958* | (2019.01) | |
| *G06Q 20/12* | (2012.01) | |
| *G06Q 20/32* | (2012.01) | |
| *G06F 3/0484* | (2013.01) | |
| *G06Q 20/10* | (2012.01) | |
| *G06Q 30/02* | (2012.01) | |
| *G06Q 50/00* | (2012.01) | |
| *H04L 12/58* | (2006.01) | |
| *H04L 29/06* | (2006.01) | |

(52) U.S. Cl.
CPC ........ *G06F 16/9535* (2019.01); *G06F 16/972* (2019.01); *G06Q 20/10* (2013.01); *G06Q 20/12* (2013.01); *G06Q 20/322* (2013.01); *G06Q 30/0277* (2013.01); *G06Q 50/01* (2013.01); *H04L 51/32* (2013.01); *H04L 67/10* (2013.01); *H04L 67/146* (2013.01); *H04L 67/20* (2013.01); *H04L 67/2842* (2013.01); *H04L 67/42* (2013.01); *H04L 67/18* (2013.01)

(56) References Cited

U.S. PATENT DOCUMENTS

| | | |
|---|---|---|
| 2011/0131106 A1 | 6/2011 | Eberstadt et al. |
| 2013/0268367 A1 | 10/2013 | Erdogan |
| 2014/0207547 A1 | 7/2014 | Cheng et al. |
| 2014/0214533 A1 | 7/2014 | Box et al. |
| 2014/0229857 A1 | 8/2014 | Haugen et al. |
| 2014/0297739 A1* | 10/2014 | Stein ........................ H04L 67/22 709/204 |
| 2015/0033347 A1* | 1/2015 | Sulaiman ............ H04L 63/1433 726/25 |
| 2015/0331948 A1* | 11/2015 | Arning .................. G06F 16/958 707/706 |
| 2016/0028805 A1* | 1/2016 | Michaud ................. H04L 43/12 709/203 |
| 2016/0132278 A1* | 5/2016 | Gillard ...................... G06F 3/14 345/682 |
| 2017/0098197 A1* | 4/2017 | Yu ....................... G06Q 10/1095 |
| 2018/0047020 A1* | 2/2018 | Vasta ................. G06Q 20/3276 |
| 2018/0356961 A1* | 12/2018 | Lewis ................. G06F 3/04842 |

OTHER PUBLICATIONS

Greg Kumparak, "Reddit Acquires Alien Blue, The Most Popular Unofficial Reddit App", Oct. 15, 2014, techcrunch.com, pp. 1-3 (Year: 2014).*
Alien Blue, "Alien Blue 2.8 (iPhone) is now available", 2013, https://www.reddit.com/r/AlienBlue/comments/1mnnm7/alien_blue_28_iphone_is_now_available/, pp. 1-4 (Year: 2013).*
Facebook Inc., International Search Report and Written Opinion, PCT/US2016/047209, dated May 11, 2017, 14 pgs.
Chan, When One App Rules Them All: The Case of WeChat and Mobile in China, Aug. 6, 2015, 15 pgs., Andreessen Horowitz, http://a16z.com/2015/08/06/wechat-china-mobile-first.
Facebook Inc., Extended European Search Report, EP17178353.3, dated Oct. 17, 2017, 8 pgs.
Facebook Inc., Communication Pursuant to Article 94(3), EP17178353.3, dated Dec. 10, 2019, 9 pgs.
Facebook Inc., International Preliminary Report on Patentability, PCT/US2016/017209, dated Feb. 12, 2019, 11 pgs.

* cited by examiner

METHODS AND SYSTEMS FOR ACCESSING THIRD-PARTY SERVICES WITHIN APPLICATIONS

TECHNICAL FIELD

This relates generally to accessing online services, including but not limited to accessing services of third-party service providers within applications for service providers distinct from the third-party service providers.

BACKGROUND

As the popularity of mobile devices markedly increases, so too does the use and development of applications on such devices. However, the discovery of applications continues to be a major challenge that limits the number of people using or enjoying the applications. Particularly, even if users are actively discovering new applications, users typically must perform a number of actions before being able to use the applications, including downloading, installing, and executing the applications, in addition to creating an account or providing other information.

SUMMARY

Accordingly, there is a need for methods, systems, and interfaces for accessing services of third-party service providers in a simple and efficient manner. By loading pages associated with third-party service providers in an application associated with a distinct service provider, and leveraging information associated with a user that was previously collected by the distinct service provider, users are able to conduct transactions with the third-party service providers simply through the loaded pages. This bypasses the need to separately load stand-alone third-party applications in order to access third-party services or features, a process that is often cumbersome and dissuades users from utilizing available third-party services. Advantageously, the resulting experience from the methods, systems, and interfaces disclosed for accessing third-party services is more seamless and native to the user.

In accordance with some embodiments, a method is performed at a client device with one or more processors and memory storing instructions for execution by the one or more processors. The method includes providing to a user, in an application associated with a social-networking service provided by a server system, a link to a page associated with a third-party service provider. The third-party service provider is distinct from the social-networking service. In response to user selection of the link, the page is loaded within the application. The page includes script for calling one or more application programming interfaces (APIs) of the server system. The client device calls the one or more APIs to obtain information associated with the user from the server system. Furthermore, the client device displays the page within the application, and uses the information associated with the user to conduct a transaction with the third-party service provider through the page.

In accordance with some embodiments, a client device includes one or more processors, memory, and one or more programs; the one or more programs are stored in the memory and configured to be executed by the one or more processors. The one or more programs include instructions for performing the operations of the method described above for the client device. In accordance with some embodiments, a non-transitory computer-readable storage medium has stored therein instructions that, when executed by the client device, cause the client device to perform the operations of the method described above.

In accordance with some embodiments, a method is performed at a server system of a social-networking service. The server system has one or more processors and memory storing instructions for execution by the one or more processors. The method includes receiving a request from a client device for a page associated with a third-party service provider, wherein the third-party service provider is distinct from the social-networking service. The page is provided to the client device. The page includes script for calling one or more application programming interfaces (APIs) of the server system. One or more calls are received from the script to respective APIs of the one or more APIs. In response to the one or more calls, information associated with the user from the social-networking service is provided to the client device for use in the page. The page enables the user to conduct a transaction with the third-party service provider based at least in part on the information.

In accordance with some embodiments, a server system includes one or more processors, memory, and one or more programs; the one or more programs are stored in the memory and configured to be executed by the one or more processors. The one or more programs include instructions for performing the operations of the server-side method described above. In accordance with some embodiments, a non-transitory computer-readable storage medium has stored therein instructions that, when executed by the server system, cause the server system to perform the operations of the server-side method described above.

Thus, client devices and server systems are provided with more effective and efficient methods for providing users access to third-party services without having to use separate third-party applications.

Some embodiments disclosed are directed to a method and a storage medium, wherein any feature mentioned in one claim category, e.g. method, can be claimed in another claim category, and also in a system and a computer program product claim as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In some embodiments, a computer-implemented method may be provided, the method comprising:

at a client device having one or more processors and memory storing instructions for execution by the one or more processors:

in an application, in particular running on or installed on the client device and associated with a social-networking service, in particular social networking service system, provided by a server system, providing to a user, in particular to a user interface of the application, a link to a page, in particular webpage, associated with a third-party service provider, in particular third-party service provider system, wherein the third-party service provider is distinct from the social-networking service;

in response to a user selection, in particular in response to receiving a user selection, of the link, loading the page within the application, wherein the page includes script for calling one or more application programming interfaces (APIs) of the server system;

calling the one or more APIs to obtain information associated with the user from the server system;

displaying the page within the application; and using the information associated with the user to conduct a transaction with the third-party service provider through the page.

In some embodiments, the information may include an identifier for the user in the social-networking service; and using the information to conduct the transaction may comprise associating the identifier with the transaction.

In some embodiments, the information may comprise payment information for the user in the social-networking service; and using the information to conduct the transaction may comprise using the payment information to pay for the transaction.

In some embodiments, displaying the page may comprise displaying a recommendation, in particular selectable recommendation, for the transaction based at least in part on the information.

In some embodiments, the information may comprise a location of the user as determined by the client device; and the recommendation may be based at least in part on the location.

In some embodiments, the information may comprise a history of the user's activity in the social-networking service; and the recommendation may be based at least in part on the history.

In some embodiments, the information may comprise a history of activity of contacts of the user in the social-networking service; and the recommendation may be based at least in part on the history.

In some embodiments, the information may comprise information obtained by a hardware resource of the client device.

In some embodiments, providing the link to the page may comprise displaying, within the application, an advertisement, in particular advertisement content item, for the third-party service provider, wherein the advertisement, in particular advertisement content item, may link to the page.

In some embodiments, the method may further comprise:
receiving, through the application, user input specifying a search query;
providing the search query to the server system;
receiving results for the search query from the server system, the results including a reference to the third-party service provider that links to the page; and
displaying the search results within the application;
wherein providing the link, in particular selectable link, to the page comprises displaying the reference to the third-party service provider within the search results.

In some embodiments, providing the link to the page may comprise at least one of:
displaying, within the application, a notification regarding the third-party service provider, wherein the notification links to the page;
displaying, within the application, a social-media post previously saved by the user, wherein the social-media post links to the page; and displaying, within a private messaging interface of the application, a message from another user of the social-networking service, wherein the message links to the page.

In some embodiments, the method may further comprise:
after conducting the transaction, ceasing to display the page within the application;
after ceasing to display the page, receiving a notification regarding the transaction, wherein the notification may be pushed to the client device from the server system; and
displaying the notification within the application.

In some embodiments, a computer-implemented method may be provided, the method comprising:
at a server system of a social-networking service, in particular social-networking service system, the server system having one or more processors and memory storing instructions for execution by the one or more processors:
receiving a request from a client device for a page, in particular a webpage, associated with a third-party service provider, in particular a third party service provider system, wherein the third-party service provider is distinct from the social-networking service;
providing the page to the client device, wherein the page includes script for calling one or more application programming interfaces (APIs) of the server system;
receiving one or more calls from the script to respective APIs of the one or more APIs; and
in response to the one or more calls, providing information associated with the user from the social-networking service to the client device for use in the page, wherein the page enables the user to conduct a transaction with the third-party service provider based at least in part on the information.

In some embodiments of the method executed at the server system, providing the page to the client device may comprise:
retrieving the page;
injecting the script into the retrieved page; and
transmitting the retrieved page with the injected script to the client device, wherein retrieving the page may optionally comprise:
obtaining the page from a third-party server associated with the third-party service;
caching the page in memory at the server system; and
retrieving the cached page from the memory at the server system.

In some embodiments of the method executed at the server system, the information may include at least one of an identifier for the user in the social-networking service, payment information for the user in the social-networking service, a history of the user's activity in the social-networking service, a history of activity of contacts of the user in the social-networking service, or information from a hardware resource of the client device.

In some embodiments of the method executed at the server system, the page may include a recommendation for the transaction based at least in part on the information.

In some embodiments, a non-transitory computer-readable storage medium storing one or more programs for execution by one or more processors may be provided, the one or more programs including instructions when carried out on the one or more processors to:
carry out on a client system a method according to one or more embodiments as described herein or
carry out on a server system for a social-networking service a method according to one or more embodiments as described herein.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Figure 1:
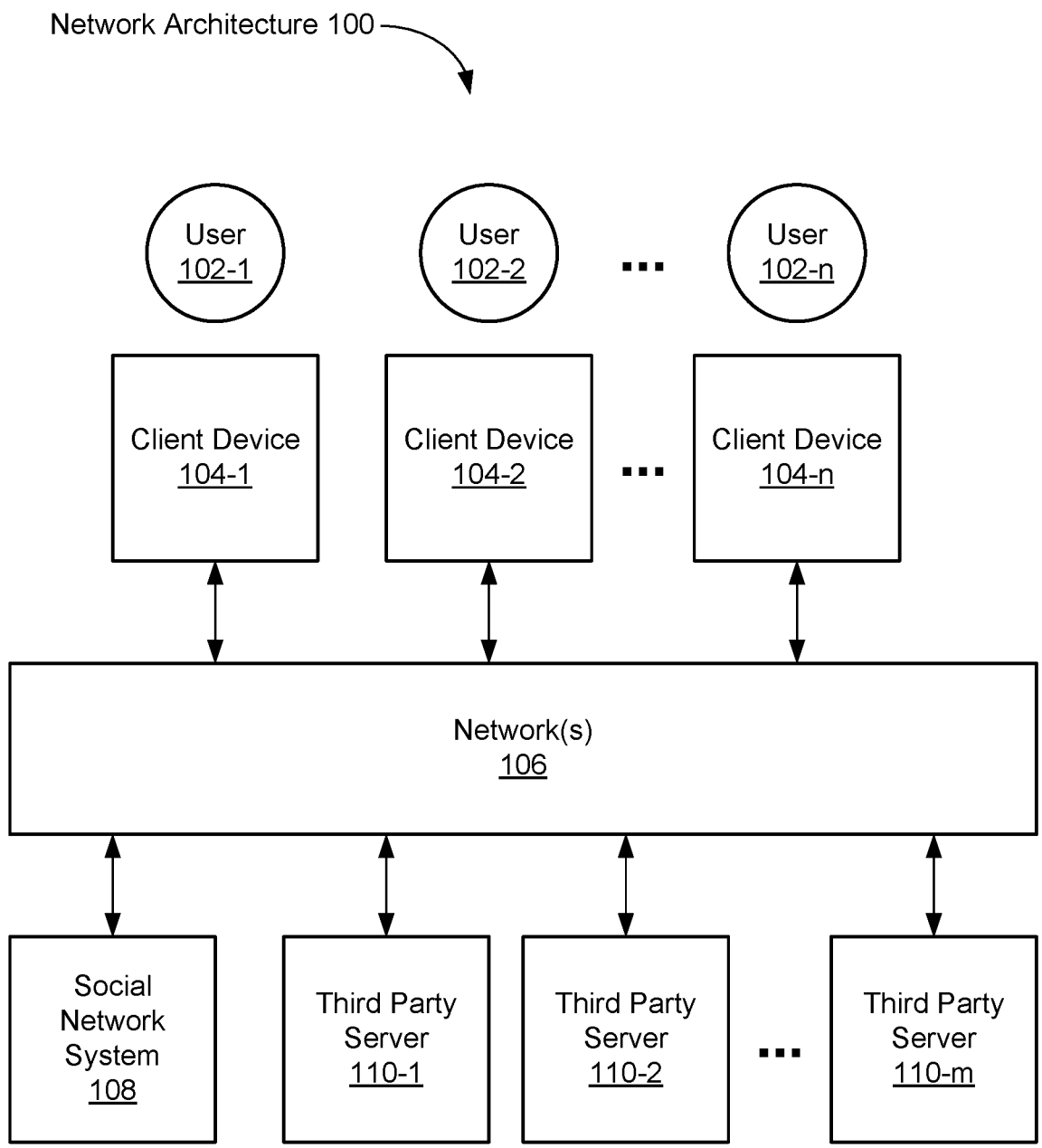
FIG. 1 is a block diagram illustrating an exemplary network architecture of a social network, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first application programming interface could be termed a second application programming interface, and, similarly, a second application programming interface could be termed a first application programming interface, without departing from the scope of the various described embodiments. The first application programming interface and the second application programming interface are both application programming interfaces, but they are not the same application programming interface.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network, in accordance with some embodiments. The network architecture 100 includes a number of client devices (also called "client systems," "client computers," or "clients") 104-1, 104-2, . . . 104-n communicably connected to an electronic social-network system 108 (e.g., a server system) by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet). In some embodiments, the social-network system 108 is a server system for a social-networking service provider that provides access to at least some services and/or features for third-party providers. Users interacting with the client devices 104-1, 104-2, . . . 104-n can participate in the social-networking service provided by the social-network system 108 by providing and/or consuming (e.g., posting, writing, viewing, publishing, broadcasting, promoting, recommending, sharing, commenting on, liking) digital content, such as text comments (e.g., statuses, updates, posts, announcements, replies, location "check-ins," private/group messages), photos, videos, audio files, links (e.g., to web pages, articles, pages associated with third-party service providers, etc.), documents, advertisements, and/or other electronic content.

Users of the social-networking service can also annotate information posted by other users of the social-networking service (e.g., endorsing or "liking" a posting of another user, commenting on a post by another user or publishing source, and/or providing other types of user feedback). In some embodiments, information can be posted on a user's behalf by systems and/or services external to the social-network system 108. For example, a user may post a review of a movie to a movie-review website, and with proper permissions that website may cross-post the review to the social network system 108 on the user's behalf.

In connection with using or participating in a social-networking service, the digital content that users may consume, provide, and/or otherwise interact with is accessible through various features or entry points of the social-networking service. For example, digital content may be accessible and presented via one or more pages, feeds (e.g., a newsfeed, a user wall, a timeline, a notifications section for highlighting new/updates to digital content, etc.), applications, and/or other interfaces for specific types of digital content (e.g., interfaces for accessing private messages, accessing saved social-network content, searching for social-network content, etc.) maintained by and within the social-networking service. As described throughout, pages associated with third-party providers may be linked to in various ways (e.g., within a user post in a feed, a notification, a private message between users, etc.).

Figure 3:
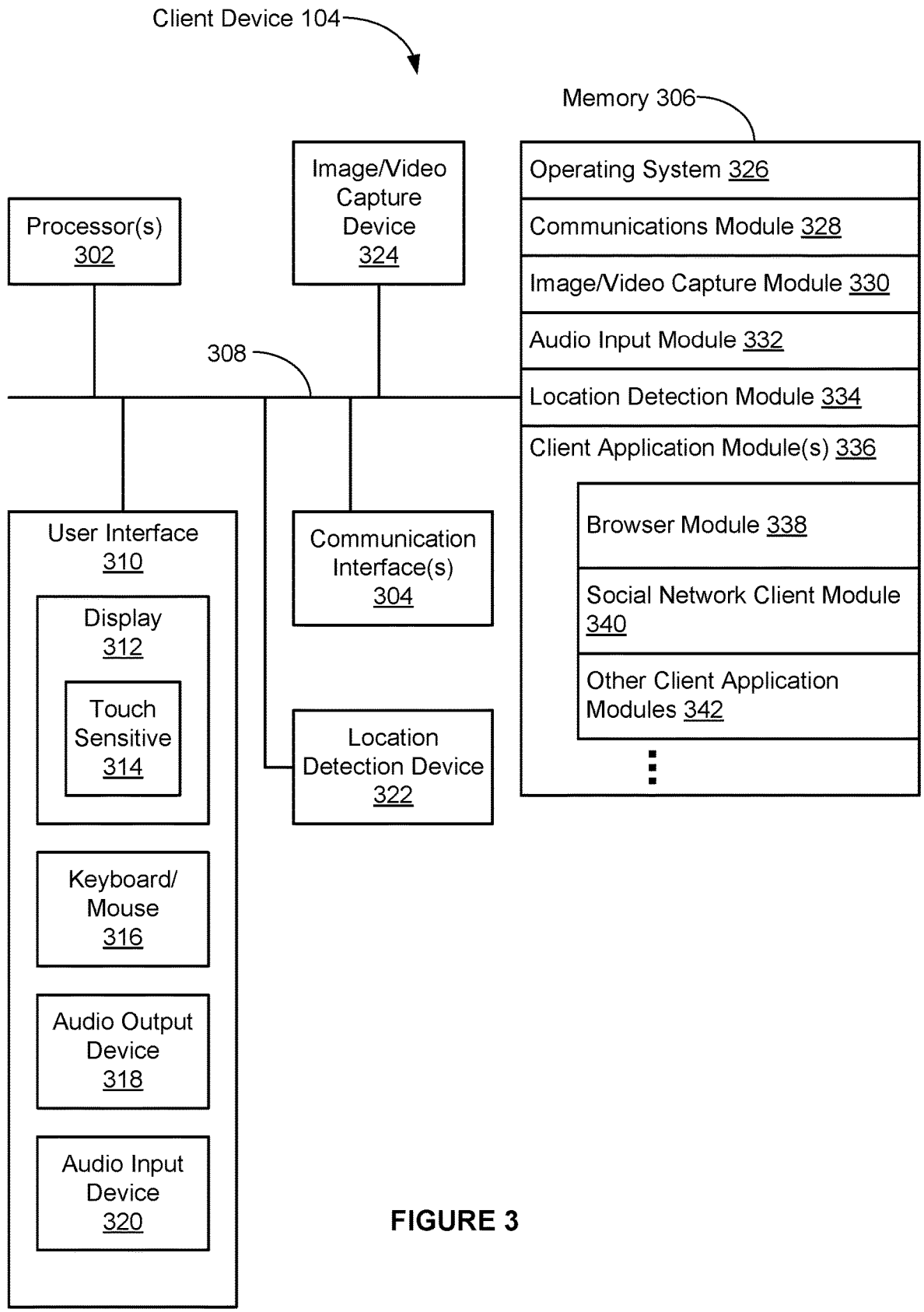
FIG. 3 is a block diagram illustrating an exemplary client device, in accordance with some embodiments.

In some embodiments, a software application executing on a mobile client device, with proper permissions, may obtain information from hardware resources/components of the client device (e.g., image/video capture device 324, location detection device 322, microphone, sensors, etc., FIG. 3). For example, global positioning system (GPS) or other geo-location capabilities (e.g., Wi-Fi or hybrid positioning systems) may be accessed by a software application on the client device (e.g., social network client module 340, FIG. 3) to determine the user's location and update the social network system 108 with the user's location (e.g., "At Home," "At Work," or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some implementations, third-party servers 110 are associated with third-party service providers who provide services and/or features to users of a network (e.g., users of the social-network system 108, FIG. 1). Users may conduct transactions (e.g., financial transactions) with the third-party service providers by communicating and exchanging data with third-party servers 110 directly (e.g., via networks 106) and/or indirectly (e.g., via social network system 108).

For example, in some embodiments, a given third-party server 110 is used to host third-party websites that provide pages to client devices 104, either directly or in conjunction with the social-network system 108. In some embodiments, a given third-party server 110 is used to host third-party applications that are used by client devices 104, either directly or in conjunction with the social-network system 108.

In some embodiments, users may access third-party services by loading pages associated with third-party service providers within an application for a service provider distinct from the third-party service providers (e.g., by selecting links provided within social network client module 340 to access pages of a third-party service). Pages are a type of digital document that may include some common elements of other web documents (e.g., document includes markup language, such as Hyper Text Markup Language (HTML), Extensible Markup Language (XML), Java, etc.).

Pages may also include script (e.g., one or more distinct scripts) (e.g., JavaScript inserted into the page by the social-network system 108) for calling one or more application programming interfaces (APIs) of a server system for the social-networking service (e.g., one or more APIs of the social-network system 108, FIG. 1) to obtain user information (e.g., location information, payment credentials, profile information, etc. collected and stored in connection with using the social-networking service). The script may be executed at some time during a user's interaction with the loaded page (e.g., when the page is loaded, in response to a detected interaction within a loaded page, etc.).

The script allows user information maintained by the social-networking service to be leveraged in transactions conducted between users and third-party service providers. These implementations provide a more efficient, integrated, and seamless alternative to accessing third-party services and features via stand-alone third-party applications (e.g., other client application modules 342, distinct from social network client module 340, FIG. 3), while optionally leveraging user information maintained in connection with other service providers in a network (e.g., a social-networking service provided by social-network system 108).

Exemplary third-party services (e.g., provided by third-party service providers) include, but are not limited to, services, products, and/or applications for or related to: books, business, communication, contests, e-commerce (e.g., pages for purchasing goods or services from online retailers), education, entertainment, fashion, finance, food and drink, games, health and fitness, lifestyle, local information (e.g., pages for real-time viewing of mass transit schedules), movies (e.g., pages for movie reviews, purchasing movie tickets, etc.), television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device (e.g., server computer), while in other embodiments, a given third-party server 110 is implemented by multiple computing devices working together to perform the actions of a server system (e.g., cloud computing).

Figure 2:
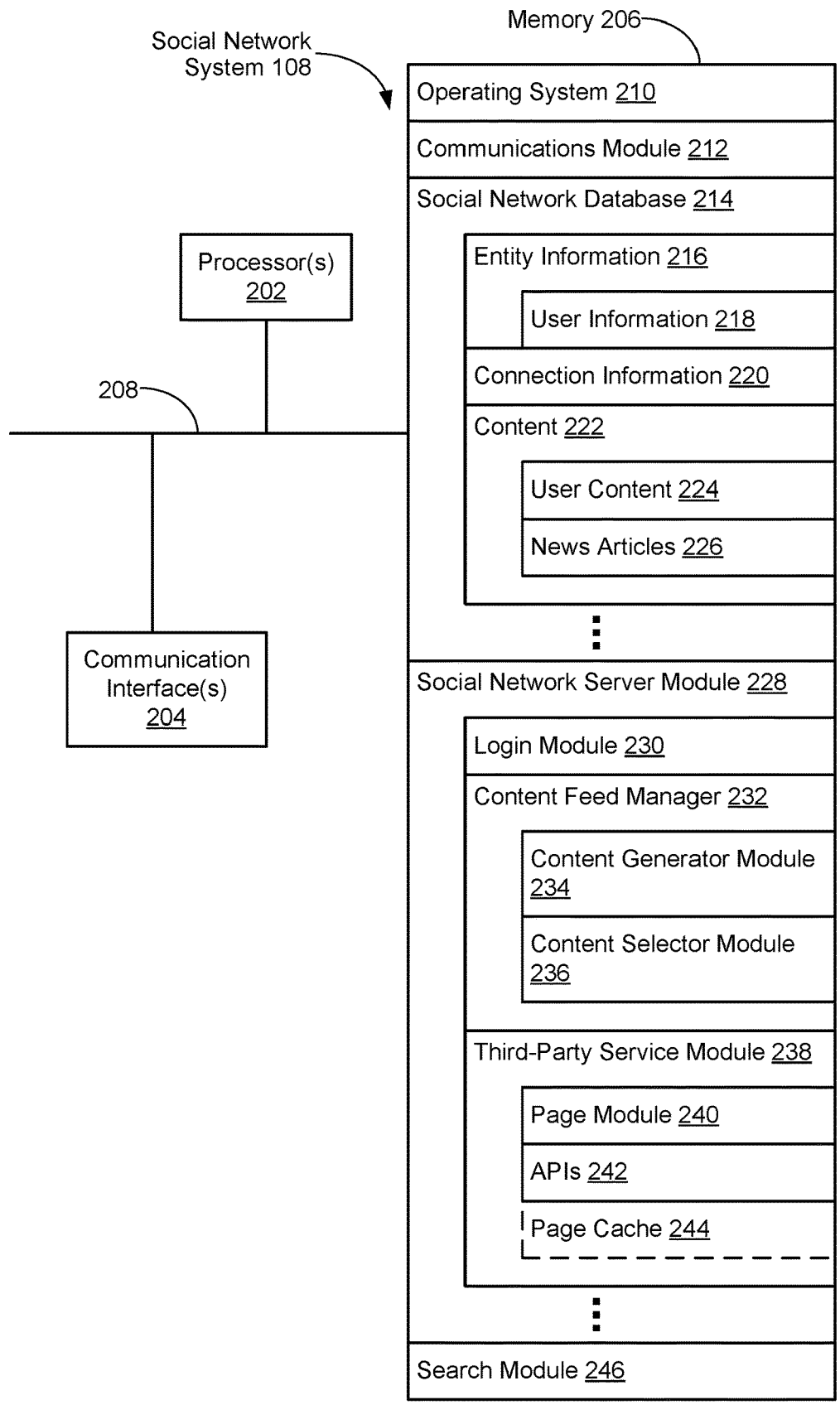
FIG. 2 is a block diagram illustrating an exemplary social-network system, in accordance with some embodiments.

FIG. 2 is a block diagram illustrating an exemplary social-network system 108, in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106);
- a social network database 214 for storing data associated with the social networking service, such as:
  - entity information 216, such as user information 218;
  - connection information 220; and
  - content 222, such as:
    - user content 224; and/or
    - news articles 226;
- a social network server module 228 for providing social-networking services and related features (e.g., in conjunction with social network client module 340 on the client device 104, FIG. 3), which includes:
  - a login module 230 for logging a user 102 at a client 104 into the social-network system 108;
  - a content feed manager 232 for providing content to be sent to clients 104 for display, which includes:
    - a content generator module 234 for adding objects to the social network database 214, such as images, videos, audio files, comments, status messages, links, applications, and/or other entity information 216, connection information 220, or content 222; and
    - a content selector module 236 for choosing the information/content to be sent to clients 104 for display; and
  - a third-party service module 238 for providing users access to services of third-party service providers using an application (e.g., social network module 340, FIG. 3) for a social-networking service (e.g., provided by the social network system 108), which includes:
    - a page module 240 for retrieving requested pages associated with third-party service providers (e.g., from third-party servers 110), injecting script into the pages, and/or providing the pages (e.g., to client devices 104);
    - application programming interfaces (APIs) 242 for receiving API calls (e.g., from script in a page) to obtain information associated with users (e.g., of the social-networking service), and in response, retrieving (e.g., from social network database 214) and providing (e.g., to client devices 104) the requested information; and
    - an optional page cache 244 storing pages associated with third-party service providers (e.g., obtained from third-party servers 110); and
  - a search module 246 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, payment credentials (e.g., credit-card or debit-card information, bank information, etc. for conducting financial transactions through the social-networking service), privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

In some implementations, third-party servers 110 (FIG. 1) include some or all of the same components, modules, and sub-modules as described above in FIG. 2 for the social-network system 108.

FIG. 3 is a block diagram illustrating an exemplary client device 104, in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

In some embodiments, the client device 104 includes one or more optional sensors 323 (e.g., gyroscope, accelerometer) for detecting a motion and/or change in orientation of the client device. In some embodiments, a detected motion and/or orientation of the client device 104 (e.g., the motion/change in orientation corresponding to a user input produced by a user of the client device) is used to manipulate an interface (or content within the interface) displayed on the client device 104.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;

an audio input module 332 (e.g., a microphone module) for processing audio captured by the audio input device 320, where the respective audio may be sent or streamed (e.g., by a client application module 336) to the social-network system 108;

a location detection module 334 (e.g., a GPS, Wi-Fi, or hybrid positioning module) for determining the location of the client device 104 (e.g., using the location detection device 322) and providing this location information for use in various applications (e.g., social network client module 340); and one or more client application modules 336, including the following modules (or sets of instructions), or a subset or superset thereof:

a web browser module 338 (e.g., Internet Explorer by Microsoft, Firefox by Mozilla, Safari by Apple, or Chrome by Google) for accessing, viewing, and interacting with web sites;

a social network module 340 for providing an interface to a social-networking service (e.g., a social-networking service provided by social-network system 108) and related features, and for loading (e.g., within the interface for the social network module 340) pages associated with third-party service providers (e.g., to conduct transactions with the third-party service providers); and/or optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4B:
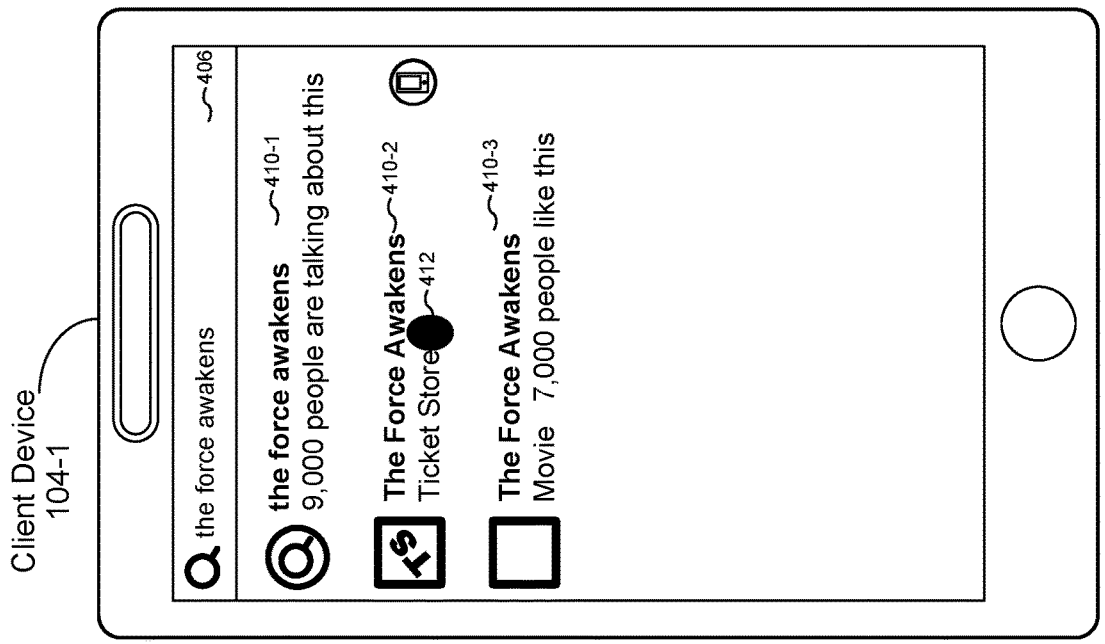
FIGS. 4A-4J illustrate exemplary graphical user interfaces (GUIs) on a client device for accessing services of third-party service providers within applications for service providers distinct from the third-party service providers, in accordance with some embodiments.

FIGS. 4A-4J illustrate exemplary GUIs on a client device 104 for accessing services of third-party service providers within an application for a service provider (e.g., the provider of social-network system 108, FIG. 1) distinct from the third-party service providers, in accordance with some embodiments. For example, The GUIs shown in FIGS. 4A-4J may be provided by an application for a social-networking service (e.g., social network module 340, FIG. 3). The GUIs in these figures are used to illustrate the processes described below, including the method 500 (FIG. 5). While FIGS. 4A-4J illustrate examples of GUIs, in other embodiments, one or more GUIs display user-interface elements in arrangements distinct from the embodiments of FIGS. 4A-4J.

Figure 4A:
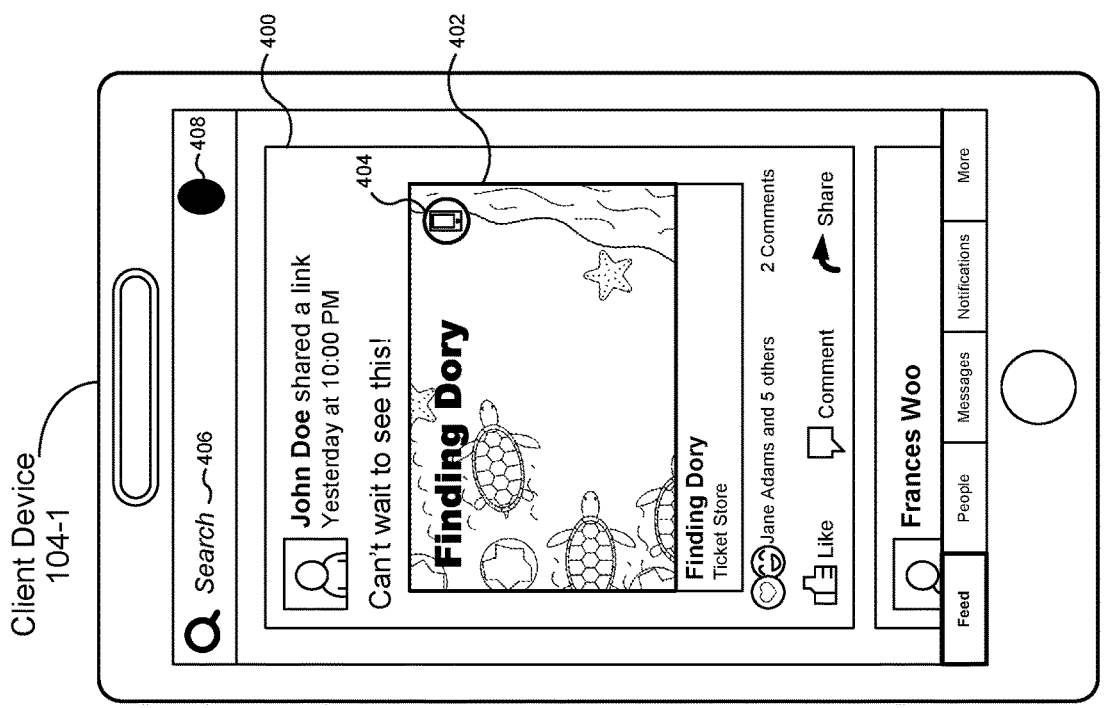

FIG. 4A illustrates a GUI for displaying and interacting with content of a social-networking service (e.g., provided by a server system social-network system 108, FIG. 1). Social-network content (e.g., text comments, media, etc.) is displayed (e.g., in a feed, a user timeline, etc.) for a particular user of the social-networking service. In some cases, social-network content includes links to pages associated with third-party service providers (e.g., third-party servers 110, FIG. 1). Various aspects of the social-networking service through which a link may be selected and an associated page accessed are described throughout FIGS. 4A-4J and the method 500 (FIG. 5).

The GUI in FIG. 4A displays a feed of social-network content. The feed includes a post 400 by user "John Doe" sharing a link 402 to a page associated with a third-party service provider. User selection of the link 402 (e.g., with a touch input) loads the corresponding page, allowing users to access services of the third-party service provider. In this example, the third-party service provider is an online movie ticket merchant, "Ticket Store," and selection of the link 402 loads a corresponding page (not shown) that enables users to purchase tickets for the movie, "Finding Dory." An optional indicia 404 may be overlaid on the link 402 to denote that the link is to a page associated with a third-party service provider, and that selecting the link loads the page within the executed application (e.g., social network client module 340, which provides an interface to the social-networking service). The page thus may be loaded without switching to another application.

The GUI in FIG. 4A also displays a search box 406 for allowing users to search for social-network or other content. In this example, a touch gesture 408 detected in search box 406 causes a GUI (FIG. 4B) for entering a search query and viewing search results to be displayed. (The GUI of FIG. 4B may include a soft keyboard, not shown, for entering the search query.) As shown in FIG. 4B, a search query for "the force awakens" is entered into the search box 406. In response, search results 410-1 through 410-3 are displayed. Here, search result 410-2 is a link to a page associated with the third-party service provider, "Ticket Store" (the same online movie ticket merchant associated with the link 402 in FIG. 4A).

In response to detecting a touch gesture 412 (FIG. 4B) on the search result 410-2, a corresponding page 414 for the third-party service provider is loaded (FIG. 4C) and displayed within the executed application. Through the displayed page 414, users may conduct transactions with the third-party service provider, and optionally access other services and features. As shown in FIG. 4C, a page associated with "Ticket Store" is displayed, providing an interface through which users may purchase tickets for the movie searched in FIG. 4C ("Star Wars: The Force Awakens"). Users may also view related media content ("VIDEOS") or information ("CAST & INFO").

As described below, script in the page 414 for calling application programming interfaces (APIs) of the server system (e.g., for the social-networking service) may be executed in order to obtain information associated with a user (e.g., user of the client device 104-1, a user who is logged into the social-networking service on client device 104-1, etc.). The obtained user information may then be used to conduct a transaction with the third-party service provider through the page 414. In this example, the obtained information includes location information 416 (e.g., a zip code), which is used at least in part to provide a recommendation for the transaction, such as a nearby (e.g., within a specified area or distance) movie theater showing the requested movie ("AMC Van Ness 14," which is 0.6 mi from the obtained zip code). Other examples of user information that may be retrieved, and their use in conducting transactions with third-party service providers, are described for the method 500 (FIG. 5).

Figure 4D:
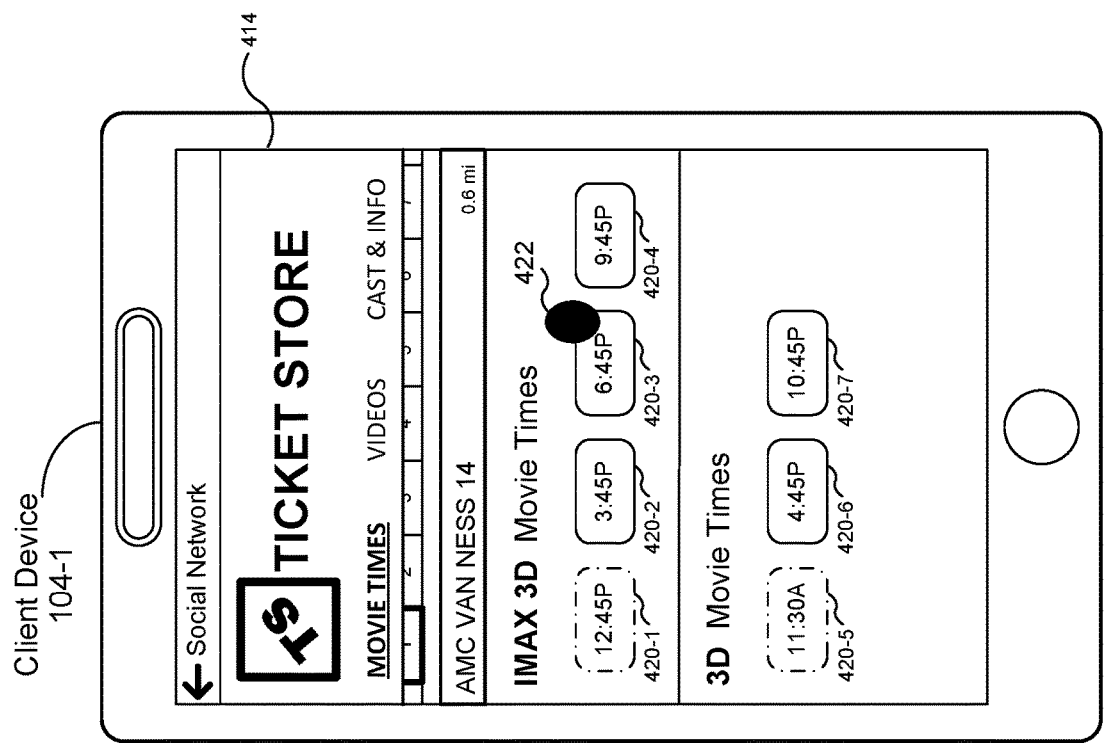
Figure 4C:
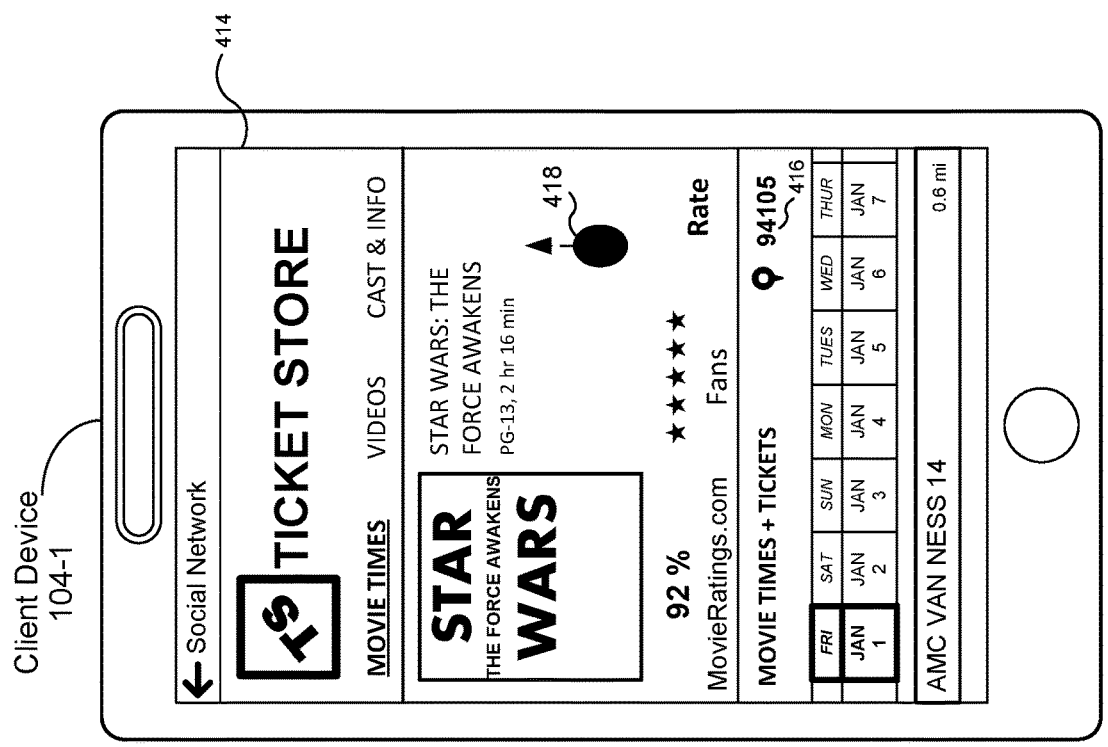
Figure 5:
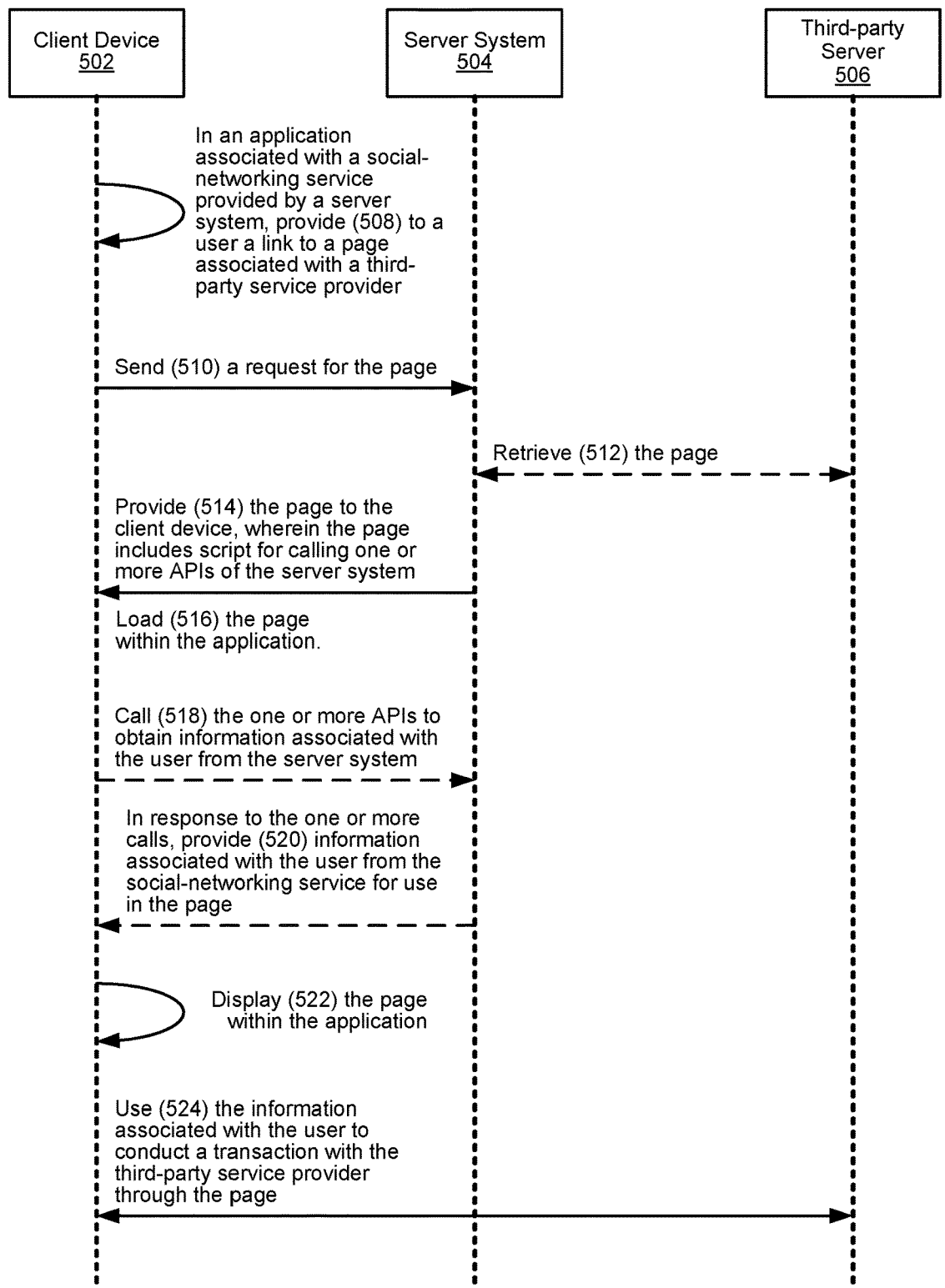
FIG. 5 is a flow diagram illustrating a method of accessing services of third-party service providers within applications for distinct service providers, in accordance with some embodiments.

An upward swipe gesture 418 is detected in FIG. 4C, causing additional portions of the page 414 to be displayed (FIG. 4D). Here, the GUI displays user-interface affordances 420-1 through 420-7 corresponding to available show times, selection of which allow users to initiate a transaction for purchasing tickets for a corresponding show time.

Figure 4F:
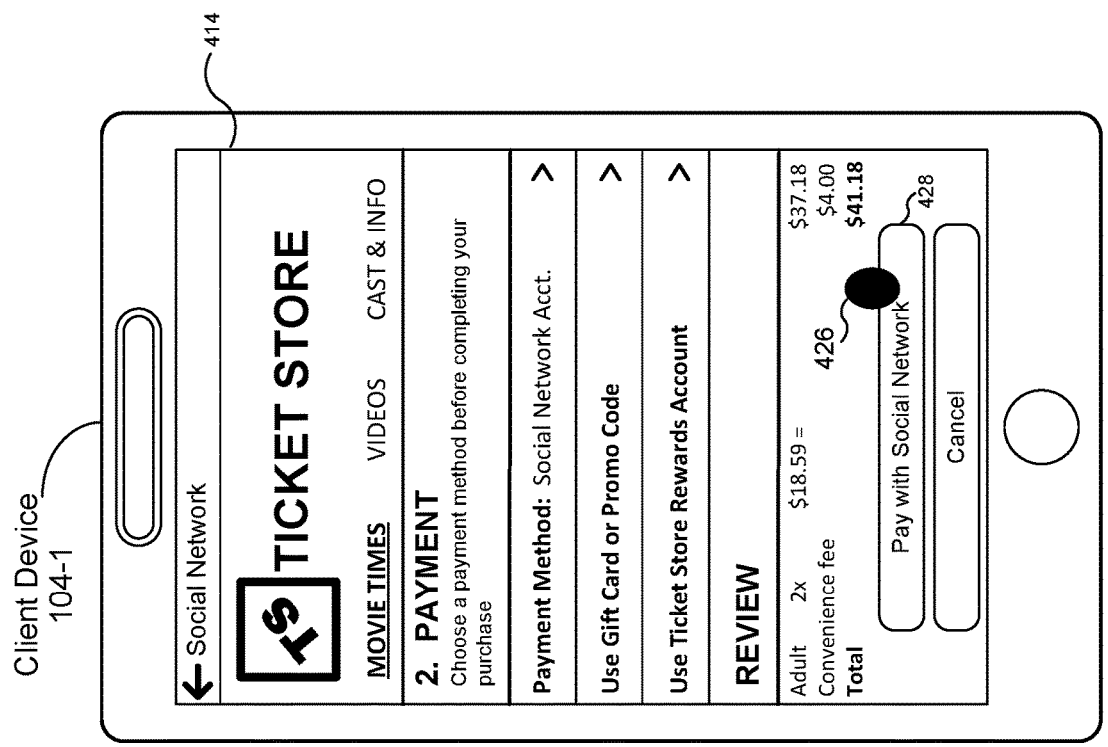
Figure 4E:
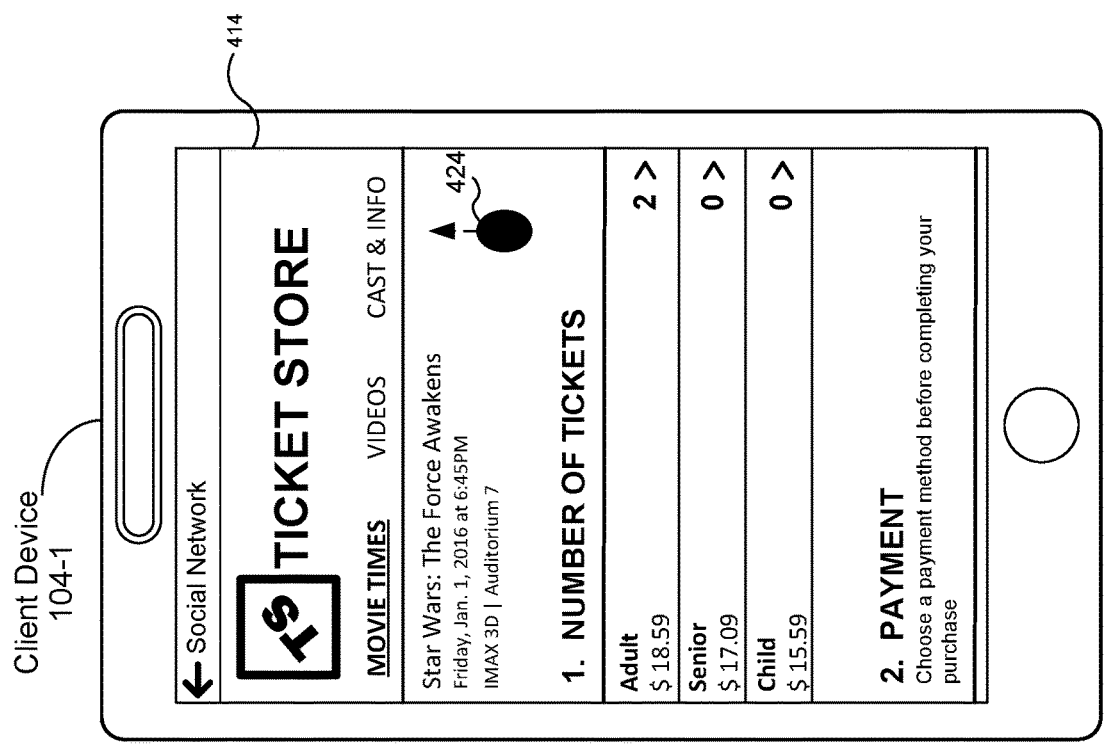

A touch gesture 422 (FIG. 4D) is detected on affordance 420-3, and in response, a GUI for completing the transaction is displayed (FIG. 4E). Here, a user may specify details of the transaction, such as a number of tickets to purchase.

A portion of the page 414 for specifying payment details is displayed (FIG. 4F) in response to detecting an upward swipe gesture 424 (FIG. 4E). Here, in conducting the financial transaction with the third-party service provider, payment credentials for the user may be retrieved from the social-networking service (e.g., by calling an API 242 of the social-network system 108, FIG. 2). In this example, payment credentials are not retrieved from the social-networking service until explicitly authorized by the user. For example, in response to detecting touch gesture 426 on affordance 428, a payment confirmation interface 430 is displayed (FIG. 4G), requiring a user to provide authorization for a one-time use of the user's e-mail address and payment credentials. Here, payment credentials and the email address are retrieved from the social-networking service (e.g., by calling APIs 242, FIG. 2) and used to complete the transaction in response to detecting touch gesture 432 on affordance 434 (FIG. 4G). A confirmation message 436 is thereafter displayed (FIG. 4H), which optionally provides users access to additional features of the third-party service (e.g., "View Ticket"). Alternatively, payment credentials are retrieved without user input (e.g., in response to loading the page).

In some embodiments, links to pages associated with third-party service providers may be provided in a notifications interface of the social-networking service. A notifications interface 438 (FIG. 4J) for viewing notifications from the social-networking service is displayed in response to detecting touch gesture 440 on affordance 442 (FIG. 4I). As shown in FIG. 4J, notifications 444-1 and 444-2 include links to pages associated with third-party service providers, and selecting the notifications causes corresponding pages to be loaded within the executed application, without switching to other applications. For example, selecting notification 444-1 causes a page associated with "Ticket Store" to be loaded, allowing the user to view details of a recently purchased movie ticket (described with respect to FIGS. 4B-4H). As another example, notification 444-2 contains the same link 402 (FIG. 4A) to a page associated with "Ticket Store," allowing a user to purchase tickets for "Finding Dory."

FIG. 5 is a flow diagram illustrating a method 500 of accessing services of third-party service providers within an application for another service provider distinct from the third-party service providers, in accordance with some embodiments.

The steps of the method 500 may be performed by any combination of a client device 502 (e.g., client device 104, FIGS. 1, 3, 4A-4J), server system 504 (e.g., social-network system 108, FIGS. 1 and 2), and/or third-party server 506 (e.g., third-party servers 110, FIG. 1). FIG. 5 corresponds to instructions stored in computer memory (e.g., memory 306 of the client device 104, FIG. 3; memory 206 of the social-network system 108, FIG. 2; memory of a third-party server 110, FIG. 1 (not shown)) or another computer-readable storage medium. To assist with describing the method 500, FIG. 5 will be described with reference to the exemplary GUIs illustrated in FIGS. 4A-4J.

In performing the method 500, the client device 502 provides (508) to a user, in an application associated with a social-networking service provided by the server system 504, a link to a page associated with a third-party service provider (e.g., search result 410-2 (FIG. 4B) is displayed in a GUI for social network client module 340, which is a link to a page 414 (FIG. 4C) for third-party service provider "Ticket Store"). The third-party service provider, which is associated with the third-party server 506, is distinct from the social-networking service. As described below, links to pages associated with third-party service providers are accessible through various (and sometimes, two or more distinct) entry points or features of the social-networking service.

For example, in some embodiments, providing (508) the link to the page includes displaying, within the application, an advertisement for the third-party service provider, wherein the advertisement links to the page.

In some embodiments, the client device 502 receives, through the application, a user input specifying a search query (e.g., "the force awakens" search query in search box 406, FIG. 4B). The search query is provided to the server system 504. The client device 502 then receives results for the search query from the server system 504. The results include a reference to the third-party service provider that links to the page (e.g., search result 410-2 (FIG. 4B) links to page 414 in FIG. 4C). The search results are displayed within the application (e.g., the GUI in FIG. 4B), wherein providing (508) the link to the page comprises displaying the reference to the third-party service provider within the search results.

In some embodiments, providing (508) the link to the page comprises displaying, within the application, a notification regarding the third-party service provider, wherein the notification links to the page (e.g., notification 444-2, FIG. 4J).

In some embodiments, providing (508) the link to the page comprises displaying, within the application, a social-media post (e.g., a shared link) previously saved by the user (e.g., using a save feature of the application), wherein the social-media post links to the page.

In some embodiments, providing (508) the link to the page comprises displaying, within a private messaging interface of the application, a message from another user of the social-networking service, wherein the message links to the page. The private messaging interface may be an interface of the social-networking service for viewing messages accessible only to the user (e.g., in contrast to posts made to a user profile timeline, which may be viewable by friends of the user).

The client device 502 sends (510) to the server system 504 (and the server system 504 receives from the client device 502) a request for the page associated with the third-party service provider. In some embodiments, the request is sent by the client device 502 in response to user selection of the link (e.g., touch gesture 412, FIG. 4B).

The server system 504 provides (514) to the client device 502 (and the client device 502 receives from the server system 504) the page. The page includes script (or multiple scripts) for calling one or more application programming interfaces (APIs) of the server system 504 (e.g., executing the script causes the social network client module 340 of client device 104 to call APIs 242 of the social network system 108).

In some embodiments, after receiving the page from the server system 504, the client device 502 caches the page in memory at the client device (e.g., memory 306, FIG. 3). Thus, when a client device accesses the page at a later time (e.g., when the user returns to the page after the client device ceases to display (522) the page within the application and/or after a transaction has been conducted (524)), the cached page may be retrieved from the memory at the client device, rather than sending a request for the page to the server system 504 (or the third-party server 506).

In some embodiments, providing (514) the page to the client device 502 includes retrieving (512) the page. The server system 504 injects the script into the retrieved page (e.g., social network system 108 adds code to a web document retrieved from third-party server 110-1, FIG. 1), and transmits the retrieved page with the injected script to the client device 502. In some embodiments, the injected script includes script facilitating navigation within or interaction with the retrieved page (or other pages associated with the retrieved page and associated with the third-party service provider) (e.g., injected script causes a navigational user interface element to be displayed on the client device, allowing users to access a site map for the page).

In some embodiments, retrieving (512) the page includes obtaining the page from the third-party server 506, caching the page in memory at the server system 504 (e.g., page cache 244, FIG. 2), and retrieving the cached page from the memory at the server system 504. Alternatively, the page is obtained from the third-party server 506 and provided to the client device 502 without being cached at the server system 504. In some embodiments, the script is injected into the page obtained from the third-party server, and the cached page is the obtained page that includes the injected script. In some embodiments, the cached page is the page obtained from the third-party server, and the script is injected into the cached page after retrieving the cached page and before transmitting to the client device the cached page with the injected script.

In some embodiments, retrieving (512) the page, caching the page, and/or injecting the script into the retrieved page are performed before providing the link to the user (step 508) and/or sending the request for the page (step 510). In other words, pages associated with third-party providers may be retrieved, cached, and/or modified (e.g., with injected script) prior to receiving any page requests from the client devices.

In response to user selection of the link, the client device 502 loads (516) the page within the application (e.g., in FIG. 4C, loading page 414 in response to touch gesture 412 (FIG. 4B)).

The client device 502 executes the script and calls (518) the one or more APIs (e.g., APIs 242, FIG. 2) (and the server system 504 receives one or more calls from the script to respective APIs of the one or more APIs) to obtain information associated with the user from the server system 504. In response to the one or more calls, the server system 504 provides (520) to the client device (and the client device receives from the server system) the information associated with the user from the social-networking service for use in the page.

The client device 502 displays (522) the page within the application (e.g., displaying page 414 within a GUI for the social network client module 340, FIG. 4C). The page enables the user to conduct a transaction with the third-party service provider (i.e., with the third-party server 506) based at least in part on the information provided by the server system 504 in response to the one or more calls. The client device 502 uses (524) the information associated with the user to conduct a transaction with the third-party service provider through the page.

In some embodiments, the information associated with the user includes information obtained by a hardware resource of the client device (e.g., media captured using image/video capture device 324 (FIG. 3), location information generated by location detection device 322, audio captured by audio input device 320, etc.).

In some embodiments, the information associated with the user includes an identifier for the user in the social-networking service (e.g., a user ID or e-mail address) (e.g., user information 218, FIG. 2), and using (524) the information to conduct the transaction comprises associating the identifier with the transaction.

Figure 4H:
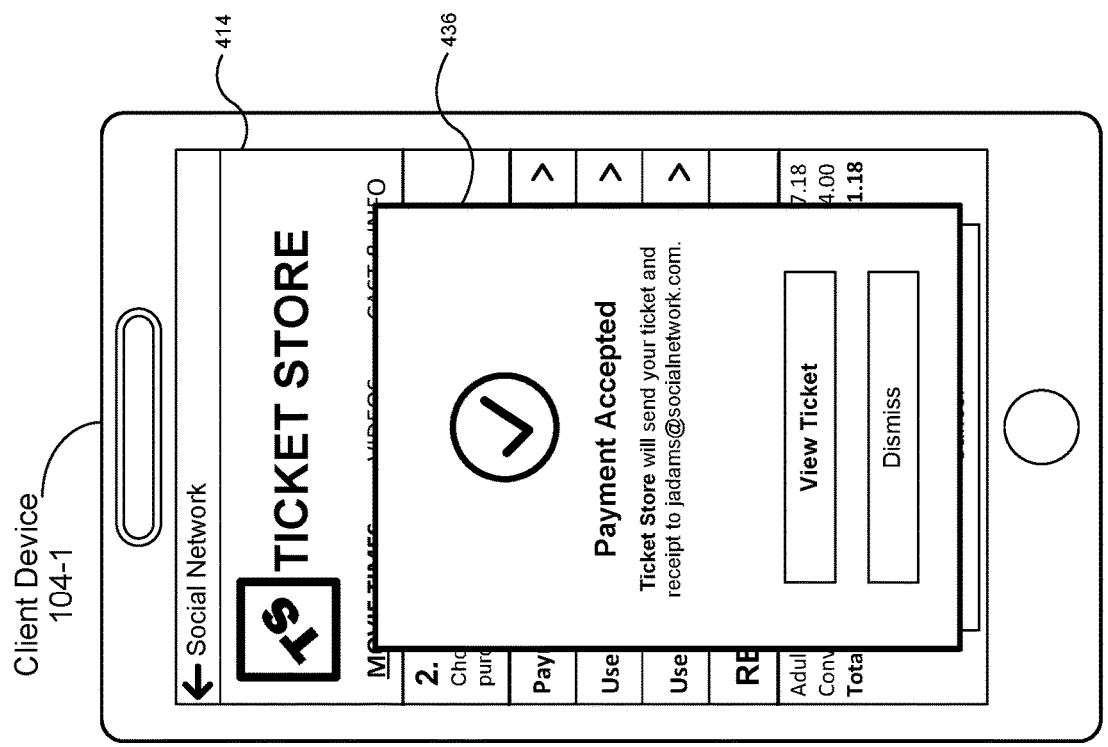
Figure 4G:
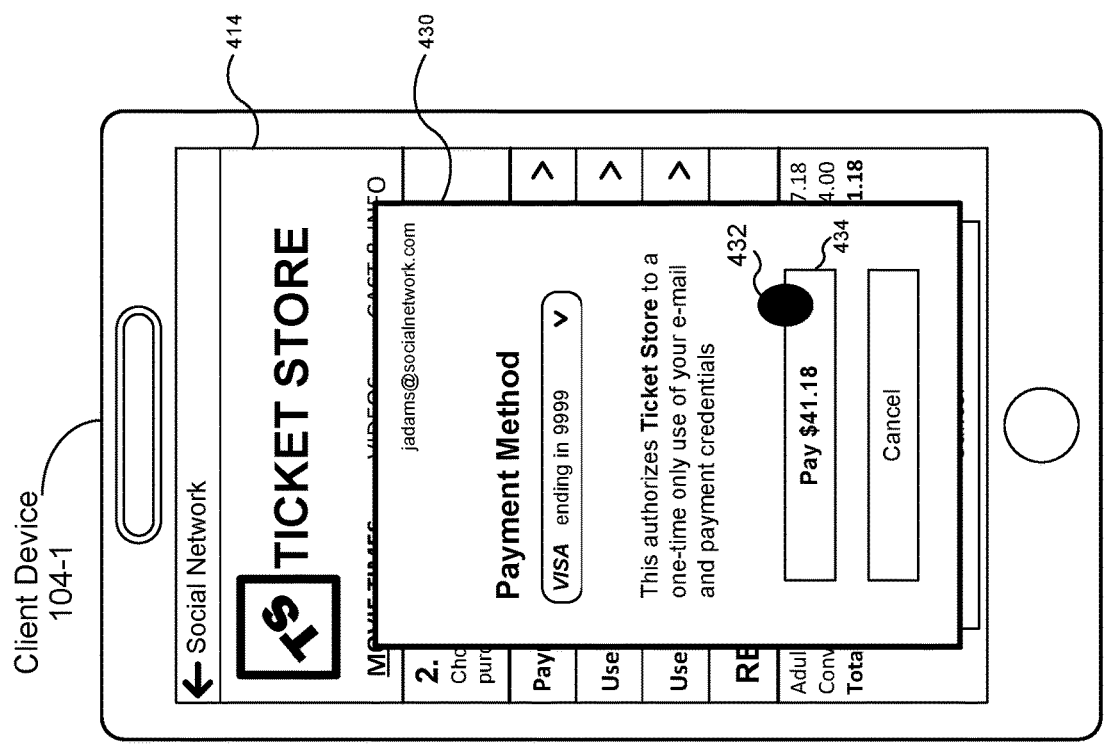
Figure 4J:
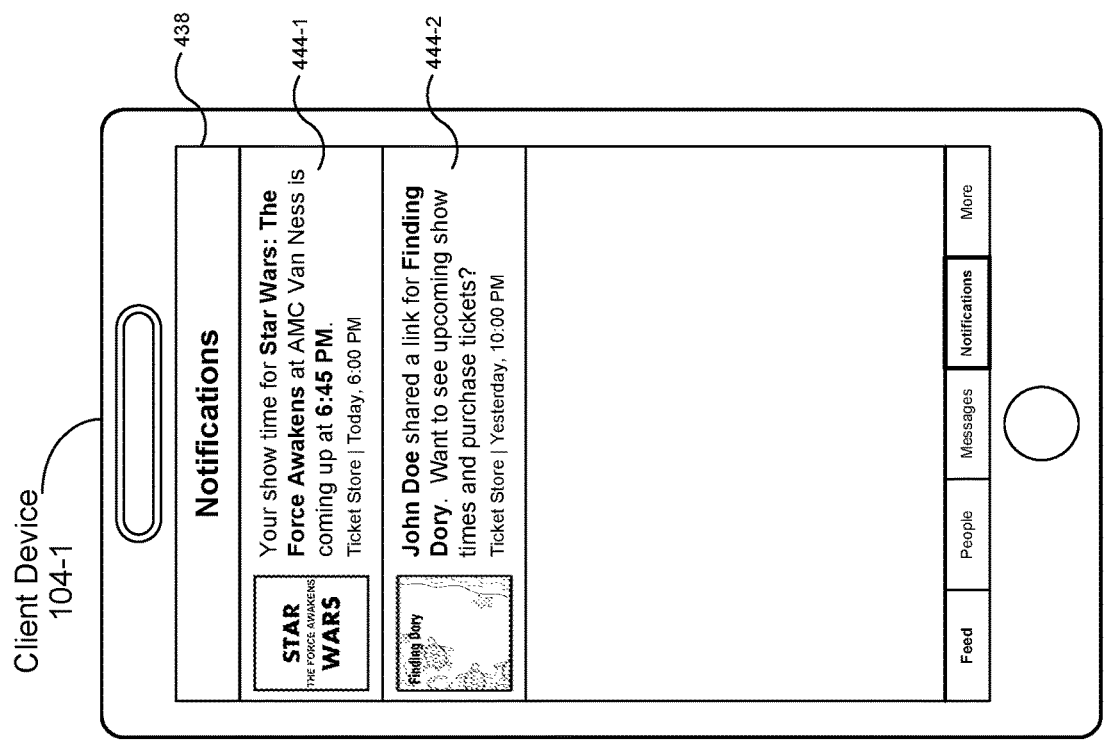
Figure 4I:
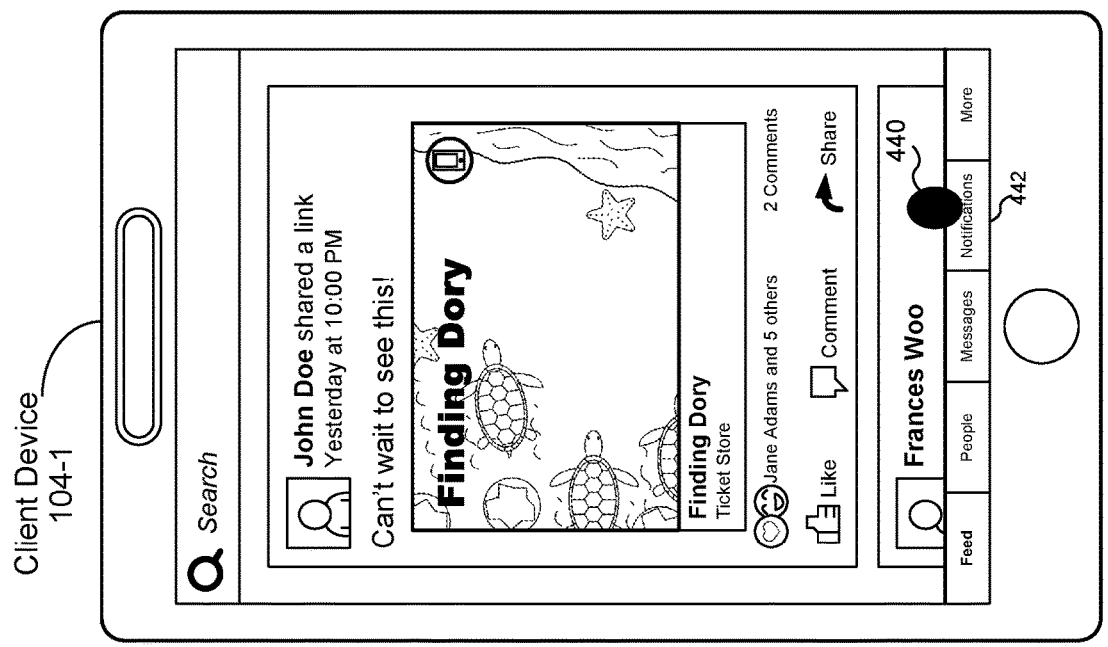

In some embodiments, the information associated with the user includes payment information for the user in the social-networking service, and using (524) the information to conduct the transaction comprises using the payment information to pay for the transaction (e.g., using payment credentials retrieved from the social-networking service, FIGS. 4F-4H).

In some embodiments, displaying (522) the page comprises displaying a recommendation for the transaction based at least in part on the information associated with the user. For example, in some implementations, the information associated with the user includes a location of the user as determined by the client device 502, and the recommendation is based at least in part on the location (e.g., in FIG. 4C, page 414 displays a recommendation for a nearby movie theater, "AMC Van Ness 14," based on the location information 416 determined by a location detection device 322 of client device 104).

In some embodiments, the information associated with the user includes a history of the user's activity in the social-networking service (e.g., actions or activities performed by user of a social-networking service, such as "likes," described in detail with respect to connection information 220 in FIG. 2), and the recommendation is based at least in part on the history (e.g., recommending products for purchase based on history of products previously purchased through the social-networking service).

In some embodiments, the information associated with the user includes a history of activity of contacts of the user in the social-networking service (e.g., actions or activities performed by friends of the user in the social-networking service), and the recommendation is based at least in part on the history (e.g., selection of link 402 in FIG. 4A loads a page (not shown) that displays a recommendation for purchasing tickets for "Finding Dory," based on a post 400 of the user "John Doe" for sharing the link 402).

Other examples of information associated with the user that may be retrieved from the server system by calling the one or more APIs include, for example, any data or information stored in social network database 214 (FIG. 2).

In some embodiments, loading (516) the page includes executing the script, and calling (518) the one or more APIs (and providing (520) the obtained information to the client device) is performed in response to executing the script (e.g., the one or more APIs are called upon detecting user selection of the link). In some embodiments, calling (518) the one or more APIs (and providing (520) the obtained information to the client device) is performed in response to detecting a user interaction in connection with the loaded page (e.g., the one or more APIs are called upon detecting a user input granting permission to retrieve and use location information, a touch gesture 432 in FIG. 4G authorizing use of payment credentials maintained by a social-networking service, etc.). In some embodiments, the one or more APIs includes a plurality of APIs, and calling (518) the plurality of APIs includes calling at least a first API of the plurality of APIs in response to loading (516) the page, and calling at least a second API of the plurality of APIs (distinct from the first API) in response to detecting a user interaction in connection with the loaded page.

In some embodiments, using (524) the information associated with the user includes transmitting the information directly from the client device 502 to a third-party server 506 of the third-party service provider. Additionally and/or alternatively, using (524) the information associated with the user includes the client device 502 providing instructions to the server system 504 to transmit the information from the server system 504 to the third-party server 506 (e.g., user authorization provided in FIG. 4G causes the user's payment credentials to be transmitted directly from the social-networking service to the third-party service provider).

In some embodiments, after conducting the transaction, the client device 502 ceases to display the page within the application. After ceasing to display the page, the client device 502 receives a notification regarding the transaction. For example, the notification is pushed to the client device 502 from the server system 504. The client device 502 displays the notification within the application (e.g., notification 444-1 in FIG. 4J is pushed to the client device after completing the ticket transaction).

In some embodiments, after providing the link to the user (508), the client device 502 sends to a third-party server 506 (and the third-party server receives from the client device) a request for the page associated with the third-party service provider. In response, third-party server 506 provides to the client device 502 (and the client device receives from the third-party server) the page, and the client device caches the page in memory at the client device (e.g., memory 306, FIG. 3). The client device 502 injects the script into the retrieved page (or optionally, the cached page), and loads (e.g., step 516) and displays (e.g., step 522) the page (or cached page) with the injected script within the application. The client device calls the one or more APIs (e.g., step 518), receives the information (e.g., step 520), and uses the information associated with the user to conduct the transaction with the third-party service provider through the page (e.g., step 524). At a later time (e.g., after the client device ceases to display the page within the application and/or after the transaction has been conducted), the client device 502 retrieves the cached page with the injected script from the memory, and loads the cached page within the application at the client device (or optionally, the client device retrieves the cached page without the injected script, injects the script into the cached page, and the loads the cached page with the injected script). Thus, a client device may cache pages (with injected script) to make subsequent page loads faster and more efficient.

For situations in which the systems discussed above collect information about users, the users may be provided with an opportunity to opt in/out of programs or features that may collect personal information (e.g., information about a user's preferences or a user's contributions to social content providers).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a client device having one or more processors and memory storing instructions for execution by the one or more processors:
        in an application associated with a social-networking service provided by a server system, providing to a user a link to a page associated with a third-party service provider, wherein the third-party service provider is distinct from the social-networking service;
        detecting user selection of the link;
        in response to the user selection of the link:
            sending to the server system a request for the page associated with the third-party service provider, wherein the page is injected with a script by the server system for calling application programming interfaces (APIs) of the server system;
            loading the page within the application, wherein the page includes the script injected by the server system for calling APIs of the server system;
            executing the script, including calling the APIs, to retrieve information associated with the user from the server system;
            displaying the page, including the retrieved information associated with the user, within the application; and
            using the retrieved information associated with the user to conduct a transaction with the third-party service provider through the page.

2. The method of claim 1, wherein:
    the information includes an identifier for the user in the social-networking service; and
    using the information to conduct the transaction comprises associating the identifier with the transaction.

3. The method of claim 1, wherein:
    the information comprises payment information for the user in the social-networking service; and
    using the information to conduct the transaction comprises using the payment information to pay for the transaction.

4. The method of claim 1, wherein displaying the page comprises displaying a recommendation for the transaction based at least in part on the information.

5. The method of claim 4, wherein:
    the information comprises a location of the user as determined by the client device; and
    the recommendation is based at least in part on the location.

6. The method of claim 4, wherein:
the information comprises a history of the user's activity in the social-networking service; and
the recommendation is based at least in part on the history.

7. The method of claim 4, wherein:
the information comprises a history of activity of contacts of the user in the social-networking service; and
the recommendation is based at least in part on the history.

8. The method of claim 1, wherein the information comprises information obtained by a hardware resource of the client device.

9. The method of claim 1, wherein providing the link to the page comprises displaying, within the application, an advertisement for the third-party service provider, wherein the advertisement links to the page.

10. The method of claim 1, further comprising:
receiving, through the application, user input specifying a search query;
providing the search query to the server system;
receiving results for the search query from the server system, the results including a reference to the third-party service provider that links to the page; and
displaying the search results within the application;
wherein providing the link to the page comprises displaying the reference to the third-party service provider within the search results.

11. The method of claim 1, wherein providing the link to the page comprises displaying, within the application, a notification regarding the third-party service provider, wherein the notification links to the page.

12. The method of claim 1, wherein providing the link to the page comprises displaying, within the application, a social-media post previously saved by the user, wherein the social-media post links to the page.

13. The method of claim 1, wherein providing the link to the page comprises displaying, within a private messaging interface of the application, a message from another user of the social-networking service, wherein the message links to the page.

14. The method of claim 1, further comprising:
after conducting the transaction, ceasing to display the page within the application;
after ceasing to display the page, receiving a notification regarding the transaction, wherein the notification is pushed to the client device from the server system; and
displaying the notification within the application.

15. A method, comprising:
at a server system of a social-networking service, the server system having one or more processors and memory storing instructions for execution by the one or more processors:
receiving a request from a client device for a page associated with a third-party service provider, wherein the third-party service provider is distinct from the social networking service;
providing the page to the client device, wherein the page is injected with a script for calling application programming interfaces (APIs) of the server system;
receiving one or more calls from the script to respective APIs; and
in response to the one or more calls, providing information associated with a user from the social-networking service to the client device for use in the page, wherein the page enables the user to conduct a transaction with the third-party service provider based at least in part on the information associated with the user.

16. The method of claim 15, wherein providing the page to the client device comprises:
retrieving the page;
injecting the script into the retrieved page; and
transmitting the retrieved page with the injected script to the client device.

17. The method of claim 16, retrieving the page comprises:
obtaining the page from a third-party server associated with the third-party service;
caching the page in memory at the server system; and
retrieving the cached page from the memory at the server system.

18. The method of claim 15, wherein the information includes at least one of an identifier for the user in the social-networking service, payment information for the user in the social-networking service, a history of the user's activity in the social-networking service, a history of activity of contacts of the user in the social-networking service, or information from a hardware resource of the client device.

19. The method of claim 15, wherein the page includes a recommendation for the transaction based at least in part on the information.

20. A non-transitory computer-readable storage medium storing one or more programs for execution by one or more processors of a server system for a social-networking service, the one or more programs including instructions for:
receiving a request from a client device for a page associated with a third-party service provider, wherein the third-party service provider is distinct from the social networking service;
providing the page to the client device, wherein the page is injected with a script for calling application programming interfaces (APIs) of the server system;
receiving one or more calls from the script to respective APIs; and
in response to the one or more calls, providing information associated with a user from the social-networking service to the client device for use in the page, wherein the page enables the user to conduct a transaction with the third-party service provider based at least in part on the information associated with the user.

* * * * *